Patented May 8, 1923.

1,454,583

UNITED STATES PATENT OFFICE.

VICTOR MORITZ GOLDSCHMIDT, OF CHRISTIANIA, NORWAY, ASSIGNOR TO A/S DE NORSKE SALTVERKER, OF BERGEN, NORWAY.

PROCESS OF PRODUCING MAGNESIUM NITRATE.

No Drawing. Application filed November 11, 1920. Serial No. 423,392.

*To all whom it may concern:*

Be it known that I, VICTOR MORITZ GOLDSCHMIDT, citizen of Norway, residing at Ullevoldsveien 58, Christiania, Norway, have invented certain new and useful Improvements in a Process of Producing Magnesium Nitrate, of which the following is a specification.

It is known that olivine and raw or calcined serpentine may be decomposed by being treated with strong mineral-acids. This reaction however—as it was hitherto performed—was not suited for technical manufacture, because the silicic acid easily precipitates in a gelatinous and difficultly filterable form.

According to the present invention this may be prevented by using nitric acid of a certain strength letting the acid act upon the raw material at a suitable temperature. The strength of the acid may suitably be fixed to 25-40 per cent and the temperature to 50-90 C°. The decomposition and treatment may advantageously be carried out according to the counter-current-principle.

Olivine as well as serpentine contains some iron, chiefly as ferrous compounds, and through the action of the nitric acid the iron is dissolved, forming a ferric compound in solution, thus contaminating the solution. However, the iron thus dissolved, may easily be removed, by adding to the solution an excess of olivine or other basic compounds in a finely divided state. By doing this, the acid character of the solution will be weakened, the solution becoming practically neutral or even basic, and when such solution is heated and stirred, the iron dissolved therein will precipitate in the form of ferric hydroxide.

The solution finally contained in one of the ways described above, consists essentially of magnesium nitrate and is separated from the undissolved substances by decanting or filtration, whereupon it is evaporated to such a degree of concentration that the magnesium nitrate will precipitate when stopping the evaporation and cooling the solution.

Even if some of the iron should remain soluble in the nitrate this is of no consequence in case the nitrate is employed for the production of oxide from which it is intended to produce anhydrous magnesium chloride intended for the production of metallic magnesium. The reason why the presence of some iron is immaterial is this, that such iron, which at first might be present in the magnesium chloride may be easily removed as the more easily volatile chloride.

I claim:

1. A process of producing magnesium nitrate which comprises treating olivine and serpentine with nitric acid of 25-40 per cent at a temperature of 50-90° C., whereby the silicic acid is precipitated in an easily filterable state.

2. In the process of claim 1, the step of adding olivine, for the purpose of precipitating the major part of the iron present in the solution, as ferric hydroxid.

In testimony whereof I affix my signature.

VICTOR MORITZ GOLDSCHMIDT.